Patented Apr. 20, 1948

2,439,797

UNITED STATES PATENT OFFICE 2,439,797

REDUCTION OF FOAMING IN AN AQUEOUS BATH CONTAINING FOAM-INDUCING CONSTITUENTS

Wayne L. Denman, Frederick, Md., assignor to Dearborn Chemical Company, Chicago, Ill., a corporation of Illinois No Drawing. Application June 28, 1944,
Serial No. 542,610

17 Claims. (Cl. 252—321)

The present invention relates to the treatment of waters or aqueous baths having present ingredients inducing foaming.

More specifically, this invention is directed to the treatment of waters of the character herein set forth with hydroxy amines or halogenated amines, preferably aliphatic hydroxy or halogenated amines, said amines being substantially insoluble in the waters treated, and having relatively little tendency to saponify with the ingredients present in the water. Further, preferably, said amines exhibit little tendency to steam distill at temperatures usually providing steam, either at atmospheric pressure or superatmospheric pressure, including temperatures usually encountered in a steam boiler.

The substituted amines of the character herein set forth may be produced in a state of a powder and introduced as such into the boiler or mixed with agents usually added to the boiler, such as lime soda mixtures or the like; or said anti-foaming compounds may be mixed with a dispersing agent or a bodying agent to increase the viscosity thereof, or with both a dispersing and a bodying agent. The viscosity-increasing agent may also act as a dispersing agent. The dispersing agent may itself have anti-foam properties and also may have the property of making the final anti-foam composition non-corrosive relative to the container of the material being treated.

In accordance with the present invention, emulsions of the herein set forth anti-foam agents may be stabilized by controlling the pH of the emulsion or dispersion.

The present invention is particularly adapted for the treatment of water or aqueous baths containing alkaline constituents or compounds inducing alkalinity. One field in which hydroxy amines or halogenated amines, or mixtures of the same, may be used is in the treatment of boiler waters, and particularly boiler waters containing "excess alkalinity," and particularly excess sodium or potassium alkalinity, that is, water in which the sodium or potassium alkalies or the equivalents, and particularly sodium or potassium hydroxides, carbonates or bi-carbonates, exist in excess of that capable of combining with or existing in combination with calcium and/or magnesium ions present in the water. The amines of the present invention may be used to inhibit the foaming tendency of raw or softened alkaline waters, and particularly boiler waters.

Alkalinity of the type referred to can exist naturally in the water or be derived from zeolite treatment of the water, or may be derived in other ways.

The present invention may be applied to raw waters, either hard or soft, and beneficial results obtained. Water which has been softened by the lime soda process or by phosphates, sodium silicates or other alkaline treatment, may be treated with anti-foam agents of the character herein set forth.

It is well known that many substances have decided anti-foam properties when used in conjunction with normal types of water which are free from excess alkalinity, such as sodium alkalinity, or which have a low percentage of sodium alkalinity. Castor oil and sperm oil typify such substances.

When materials of this type are added to waters of excess alkalinity, and especially excess sodium and/or potassium alkalinity, poor or mediocre results are obtained in reducing the foaming tendency of the water. It seems probable that the foaming occurring in boiler water is the result of the concentration of soluble salts and insoluble solids in a state of suspension. In waters of excess alkalinity there may be present sodium and/or potassium bi-carbonates and/or carbonates, and there may be present sodium and/or potassium carbonates and/or hydroxides. Under conditions prevailing in an operating boiler, a large percentage of the bi-carbonates and carbonates originally present in the water are converted into hydroxides. It may well be that because of the presence of these hydroxides the usual anti-foam materials are ineffective when added to boiler waters having high or moderately high concentrations of alkali hydroxides or other alkali materials.

When oils of the type of castor oil and sperm oil are added to boiler water, there is a tendency for them to be saponified or react chemically with the alkali hydroxides or other alkali compounds, with the resultant formation of soluble sodium and/or potassium soaps. The foaming tendencies of sodium and potassium soaps are well recognized and the formation of such soaps accelerates the tendencies of the boiler water to foam.

The following is a specific example, illustrating such acceleration and foaming tendency. An experimental boiler operating at a pressure of 200 pounds per square inch, with an excess caustic alkalinity in the neighborhood of 200 grains per gallon, was treated with a standard anti-foam material containing 16% of castor oil by weight, the proportion being one-quarter pound of the castor oil material per 1000 gallons of water. Immediately after the introduction of the anti-foam material, a test showed no foaming occurring. One hour after the introduction of the anti-foam material, the amount of foaming occurring was approximately 25% greater than that taking place before the anti-foam material was added. The increase in foaming occurring one hour after the introduction of the anti-foam material, namely, castor oil, is due to the saponification of the same by the alkalies present in the boiler water.

Steam distillation of the usual anti-foam materials may, in some measure, reduce the effectiveness of these anti-foam materials in boiler water of high or excess sodium or equivalent alkalinity. However, since most of the usual anti-foam materials can be used effectively in water containing little or no sodium alkalinity, and their effectiveness maintained, to a large degree at least, for several hours, steam distillation of the anti-foam material is probably of minor importance.

In one form of the present invention, water containing alkalinity, and particularly sodium or potassium alkalinity, is treated with a material that is unsaponifiable and does not steam distill to any marked degree. Waters softened by base exchange processes, and especially those which have been treated with zeolites or waters having a high natural sodium carbonate or sodium bicarbonate alkalinity are typical of waters having foaming properties and which may be treated in accordance with the present invention, which resides not only in said method, but also in the utilization of a particular class of anti-foam materials, and the method of preparing the same. While the average operating boiler pressure is around 200 pounds per square inch, it is to be understood that the present invention is applicable to boiler pressures materially higher or lower than 200 pounds per square inch.

Since the anti-foam agents of the present invention are insoluble or substantially so, it is desirable to disperse the anti-foam agent in the water or bath being treated, although in some instances the insoluble anti-foam agent, which may be in powder form or in powder form in admixture with other powdered materials, may be directly introduced into the water or bath being treated. It may be stated that the solubility of the aliphatic compounds of the character herein set forth decreases as the molecular weight thereof increases. Therefore, it is preferred to use an anti-foaming agent having a high molecular weight.

In that form of the invention in which a dispersing agent is used, tannin is a suitable dispersing agent. Three principal typical classes of dispersing agents are available. The first class comprises inorganic colloidal material, such as clays or bentonite; the second class, organic materials which contain appreciable quantities of soap in one form or another; and the third class, organic materials which are characterized by colloidal properties and which contain no soap of any kind. This third class of materials includes the extracts of various woods and barks which would normally be referred to as tannin extracts, extracts of various aquatic plants, such as seaweeds or kelp; and extracts of certain plants and shrubs, such as cactus plants.

Clays or bentonite may, of course, be used, but the disadvantages of this type of material make it inadvisable to use it as the sole dispersion agent, since it does not lend itself to the very great dispersion that is necessary when a very small quantity of an anti-foaming compound is dissolved in a relatively large amount of boiler feed water. However, the clays or bentonite may be used as the dispersion agent when mixed with other materials, as hereinafter set forth.

The soap dispersion agents may under some circumstances be used, but certainly not where there is an excess of alkali present, because the soap, in this case, remaining water soluble would tend to counteract the anti-foam properties of the anti-foam agent, and, moreover, in some cases, function to increase the foaming properties of the boiler water instead of decreasing them.

Investigation has been shown that tannin is a very desirable dispersing agent, because at least when waters having alkaline constituents are treated, and particularly boiler waters, the tannin has better dispersing properties than the clays or soap, while at the same time it does not have the disadvantages of the latter classes of materials.

It may be pointed out that tannin in certain cases and in certain types of waters, has fairly good anti-foam properties and, therefore, the use of tannin in conjunction with a more active anti-foam agent results in a composition having anti-foam properties superior to that of either the materials used separately. Further, the tannin acts as an active dispersing agent for the more active or primary anti-foam material, and this is highly desirable in a good anti-foam composition. Again, the tannin performs the function of conferring upon the resulting composition non-corrosive properties. This is due to the tendency of the tannin extract and similar materials to absorb dissolved oxygen from the boiler feed water or from any other water containing oxygen, which oxygen, if not removed, is one of the principal causes of boiler corrosion. Tannin, of course, is an example of a material which is an active dispersing medium and also acts as a corrosion inhibitor to prevent corrosion of the boiler metal. It is within the province of the present invention in its broad form to use other equivalent materials which perform the same functions as the tannin performs.

The composition may have present a viscosity-increasing agent or bodying material. A number of compounds may be used as the bodying agent, but it is preferable to use corn meal or a material containing starch. The corn meal or starch acts not only as a bodying material, but also as an additional dispersing agent and increases the dispersion characteristics of the composition. In accordance with one form of the present invention, the anti-foam composition has present a primary dispersing agent, and a secondary dispersion agent, the secondary dispersion agent preferably acting also as a bodying agent or to increase the viscosity of the anti-foam composition, which, of course, contains anti-foam agents, as hereinbefore pointed out.

The increase in the viscosity of the anti-foam composition is desirable since this prevents separation of the active anti-foam constituents from the remainder of the composition.

The following are examples of methods which may be used to obtain the bodying effect.

In one method the meal or starch is heated in the presence of added water or that contained in the liquid tannin extract to a temperature high enough to produce a hydrolysis of the meal. This hydrolyzed meal upon cooling takes on the form of starch paste and acts to increase the viscosity of the anti-foam composition in proportion to the amount of starch or meal used.

In one form of the invention the anti-foam composition may be introduced into the boiler with water in the form of a gelatinized product. Such a gelatinized composition may be made by mixing an amine such as a hydroxy aliphatic amine of the character set forth or halogenated amine of the character set forth with any bodying agent which will thicken the composition, including carbohydrate bodying agents, and a tannin extract.

The ingredients may be mixed in suitable proportions, of which the following Tables I to V are illustrative:

Table I (1) Corn meal—2%, tannin extract—94%, amine—4%
(2) Corn meal—4%, tannin extract—88%, amine—8%
(3) Corn meal—6%, tannin extract—78%, amine—16%
(4) Corn meal—8%, tannin extract—57%, amine—35%

In general, the amine content, such as, for example, the hydroxy or halogenated amine content, of the mixture may vary between about 2% to 35%.

The above percentages are merely illustrative of the amount of tannin extract and hydroxy aliphatic amine or hydroxy halogenated amine which may be used. These percentages may vary within the limits of the maximum and minimum above set forth and still come within the spirit of the present invention. As hitherto pointed out, the amine may be used by itself, but it is desirable for many uses that the hydroxy amine or halogenated amine be used in conjunction with tannin, and especially when a dispersion is used as the tannin assists in the dispersion of the anti-foam agent, and, further, tannin is, in itself, an anti-foam agent. As previously pointed out, in one form of the invention a gelatinized product may be used, but it is within the spirit of the present invention to use the anti-foam agent in forms other than paste form.

Instead of using corn meal or starch as the viscosity-increasing or bodying agent, various other such agents may be used, as, for example, dextrine. When using dextrine, satisfactory results have been obtained when the mixture contained from 5% to 50% of dextrine, which is a degradation product of starch. Instead of using corn meal, starch or dextrine, other bodying agents may be used. Gums, such as gum tragacanth, gum acacia and locus bean gum, which are additional examples of suitable bodying agents, give good results.

It has been ascertained that excellent results are obtained when the bodying material is one which will produce borate ions, as, for example, borax may be used as the bodying agent, or the borax may be mixed with an additional bodying agent, such as corn meal or dextrine.

The following examples illustrate how the dispersion agents and the bodying agents may be varied:

Table II

| Hydroxy Amine | Tannin Extract | Corn Meal |
|---|---|---|
| Per cent | Per cent | Per cent |
| 2 | 92 | 6 |
| 5 | 89 | 6 |
| 10 | 84 | 6 |
| 15 | 79 | 6 |
| 20 | 75 | 5 |
| 30 | 66 | 4 |
| 35 | 61 | 4 |

Table III

| Hydroxy Amine | Tannin Extract | Bentonite | Corn Starch |
|---|---|---|---|
| Per cent | Per cent | Per cent | Per cent |
| 2 | 87 | 5.0 | 6.0 |
| 5 | 84 | 5.0 | 6.0 |
| 10 | 79 | 5.0 | 6.0 |
| 15 | 74 | 5.0 | 6.0 |
| 20 | 69 | 5.0 | 6.0 |
| 30 | 60 | 5.0 | 6.0 |
| 35 | 55 | 5.0 | 6.0 |
| 2 | 82 | 10 | 6.0 |
| 5 | 79 | 10 | 6.0 |
| 10 | 74 | 10 | 6.0 |
| 15 | 70 | 10 | 5.0 |
| 20 | 65 | 10 | 5.0 |
| 30 | 56 | 10 | 4.0 |
| 35 | 51 | 10 | 4.0 |

Table IV

| Chlorinated Amine | Tannin Extract | Dextrine | Borax |
|---|---|---|---|
| Per cent | Per cent | Per cent | Per cent |
| 2 | 85 | 12 | 1.0 |
| 5 | 82 | 12 | 1.0 |
| 10 | 77 | 12 | 1.0 |
| 15 | 72 | 12 | 1.0 |
| 20 | 67 | 12 | 1.0 |
| 30 | 57 | 12 | 1.0 |
| 35 | 52 | 12 | 1.0 |

In the above illustrative example, borax used as the bodying agent, may be replaced by boric acid or by any water soluble borate, or by any substance capable of giving borate ions when dissolved in water. The amount of borax may vary over wide limits, the minimum being approximately one-eighth (⅛) of one per cent (1%), and the maximum around 5%.

Table V

| Hydroxy Amine | Tannin Extract | British Gum |
|---|---|---|
| Per cent | Per cent | Per cent |
| 2 | 86 | 12 |
| 5 | 83 | 12 |
| 10 | 78 | 12 |
| 15 | 73 | 12 |
| 20 | 68 | 12 |
| 30 | 58 | 12 |
| 35 | 53 | 12 |

It is desired to point out that the above examples are merely illustrative of suitable combinations of dispersing agents and bodying agents, together with chlorinated or hydrogenated amines, and that various other dispersing agents and bodying agents may be used and still come within the spirit of the present invention.

The alkali phosphates, such as sodium metaphosphate, mono-sodium phosphate, di-sodium phosphate and tri-sodium phosphate may be used as the dispersing agents.

Satisfactory results have also been obtained by using as the dispersing agent a sodium salt of the sulphuric acid esters of high molecular weight alcohols, such compounds being commercially known under the trade name of Orvus, Gardinol or Dreft. These compounds included under the aforesaid designations, are known as sodium lauryl sulphate. In general, it may be stated that these materials may be designated as the sodium sulphates of high molecular weight alcohols having 10 to 14 carbon atoms.

It is clear from the above that the bodying agent may be an inorganic or an organic compound. Further, it is desired to point out that many of the bodying agents set forth also act as dispersing agents, and in the preferred embodiment of the present invention, the bodying agents also act as dispersing agents. It is not desired to limit the present invention to any particular inorganic or organic bodying agent. Broadly, any bodying agent may be added which will function to increase the viscosity of the mixture, and preferably also assist in effecting a satisfactory emulsion or dispersion.

In some cases, the bodying agent may be a mixture of organic bodying agents, or may be a mixture of inorganic bodying agents, or the bodying agent may be a mixture of organic and inorganic compounds. In either case, it is preferred that the bodying agent be a dispersing agent.

While usually the amount of bodying agent will vary from 2% to 8%, it may be much higher, as, for example, when using dextrine, up to about 50% by weight of the mixture may be dextrine, and again it is not necessary that in some of the bodying agents the lower limit be 2%. Less than 2% may be used, and while 2% may be considered a satisfactory lower limit for starch, if the starch is used in conjunction with other thickening agents, such as a gum, then the starch may be reduced to less than 2%.

The anti-foam agent, such as chlorinated or hydroxylated aliphatic amine, or their derivatives or substitution products, may be mixed with a dispersing agent, preferably one which is also an anti-foam agent, as, for example, tannin, and with a bodying agent, such as corn meal and starch, and these materials, without heating, may then be passed through a colloid mill. In a mill of this character, a shearing occurs which results in reducing the particle size of the starch and thereby greatly increases the bodying effect of the bodying agent over what it is in the cold composition before the latter has been put through the colloid mill. While the passage of the material through the colloid mill favorably reduces the particle size of the starch, it also effectively operates upon the remaining ingredients of the composition, and thereby forms a permanent emulsion.

The reduction in the size of the primary anti-foam agent, such as the chlorinated or hydroxylated amine or aliphatic amine produces a much more active anti-foam agent.

Heretofore, there has been set forth the heating of the anti-foam composition to a temperature sufficient to produce a hydrolysis of the bodying agent, such as corn meal, starch and the like. The heated combination after the hydrolysis of the starch may be passed through a colloid mill or its equivalent to produce a very effective anti-foam composition. It may be pointed out that if the anti-foaming composition herein described is heated sufficiently to result in hydrolysis of the starch, dextrine or like product before passing the same through the colloid mill, there will still be produced a satisfactory dispersion of the primary anti-foam agent despite the fact that the material containing the hydrolyzed starch will become very much stiffer in composition if it has been allowed to cool and set. When the unheated anti-foam composition is passed through the colloid mill, a satisfactory dispersion may be obtained in like manner but the final composition will be somewhat thinner, due to the lack of a gel being present, the latter resulting from the hydrolysis of the cooked starch or like agent.

It may be pointed out that by passing the composition through the colloid mill, the particle size of the suspended material is reduced to a greater extent than that which is obtained by the use of any of the ordinary dispersing agents or dispersing equipment. It may be stated that it is this great reduction in the particle size of the suspended material which is responsive for the stiffening effect when the anti-foam emulsion is passed through the mill. It may also be pointed out that while the use of the colloid mill does result in the stiffening of the herein described anti-foam composition, this stiffening effect is a minor one, as compared to the stiffening effect which is accomplished by the use of a bodying agent.

The times when it is desirable to use a stiffer or thinner anti-foam composition are not dependent upon the type of water which is to be treated, but rather on the method of introducing the anti-foam composition and the climatic conditions to which the anti-foam composition is subjected during storage. For example, when it is the practice to use hot water in digesting the anti-foam composition before its introduction into the boiler, it is usually desirable to use a stiffer type of anti-foam composition than is used if the cold water is a digesting medium. Stiffer emulsions as a rule are more stable than the thinner ones, and if hot water is used as the digesting medium a somewhat stiffer and, therefore, a somewhat more stable anti-foam emulsion can be satisfactorily digested. When using cold water, it is sometimes difficult to satisfactorily break up or digest a stiff emulsion, and for this reason it is necessary that the product used be somewhat thinner. It is also commonly appreciated that with higher temperatures, the emulsions tend to become somewhat thinner. When anti-foam material is stored in very hot warehouses or other places where temperatures in the neighborhood of 90° or 100° F. are present, thinner emulsions become quite fluid, and the tendency for the conglomeration of the suspended particles is increased due to the lower viscosity of the product. Where an anti-foam composition is liable to be subjected to conditions typified by those above mentioned, it is desirable to use a stiffer or heavier product. On the other hand, during midwinter, when the anti-foam composition may be subjected to a relatively low temperature, it is desirable to use a thinner product.

In view of the above, in accordance with the present invention, the stiffness of the anti-foam composition may be controlled by the use of a bodying agent alone, or by the use of a bodying agent and the passage of the material through a colloidal mill to reduce the particle size of the suspended material. To decrease the stiffness less bodying agent is used, and to increase the stiffness, more bodying agent is used. The stiffness may be controlled even though the bodying agent is not hydrolyzed.

Anti-foam compositions of the character set forth may be stabilized, or at least their stabilization may be promoted, by the proper adjustment of the pH value of the composition.

In most cases, although not in every case, the emulsion or dispersion is more stable if the pH of the composition is maintained at the neutral point or just slightly alkaline. In other words, it is best to maintain the pH of the composition between 7 and 8, and this is especially true when using starch, corn meal, dextrine or gums.

A paste mixture preparted by any of the methods set forth and containing a primary anti-foam agent, a secondary anti-foaming agent, which preferably has dispersing properties, and a bodying agent of the character herein set forth may be added to boiler water to prevent foaming thereof. More specifically, any of the compositions herein set forth may be added to the boiler water in the ratio of one-quarter pound of the composition per 1000 gallons of water. The amount which may be added is strictly illustrative, and is not to be taken by way of limitation. Obviously, the amount of anti-foam material which is added to the water will depend upon the characteristics of the water. For example, in another experiment it was found that as low as one-twentieth ($\frac{1}{20}$) of a pound of the anti-foam composition per 1000 gallons of water was satisfactory. In still another case, two (2) pounds of the anti-foam composition per 1000 gallons of water positively inhibited the anti-foam tendency of the boiler feed.

The above mixtures and similar mixtures were added to water of the character that the castor oil, previously referred to, was added, and the conditions of the tests were the same.

Tests taken immediately after the introduction of the anti-foam composition showed no foaming occurring. Tests made two and one-half (2½) hours after the introduction of the anti-foam material showed the foaming to be practically nil. Tests which were made after continuous heating of the anti-foam material in the boiler water, under the above conditions, for eight (8) hours, showed a tendency to foam, which was only a small fraction of the foaming occurring before the anti-foam was added. After twenty (20) hours, the tendency to foam was not quite as great as that exhibited by the untreated water. Even in the presence of the anti-foam material, there is some tendency to foam, and the amount of foaming in the presence of the anti-foam material may vary from a very small percentage to 25% to 40% of the foaming that occurs before the anti-foam material is added.

Examples of amines which may be hydroxylated in accordance with the present invention are hexadecyl amine $C_{16}H_{33}NH_2$, heptadecyl amine $C_{17}H_{35}NH_2$, and octadecyl amine $C_{18}H_{37}NH_2$.

It may be pointed out that in accordance with the present invention it is the intention to treat water with chlorinated or halogenated amines or mixtures thereof, said amines being either aliphatic or aromatic amines, which are substantially insoluble in water, said amines having the property of preventing the forming of water, and particularly boiler waters or any aqueous bath containing ingredients which induce foaming. Generally, it is the chlorinated and hydroxylated amines of high molecular weight which give the most satisfactory results, and as a rule it may be stated that the most insoluble amines are those which contain more than 10 carbon atoms, and, when the amine is a primary amine, more than 10 carbon atoms; and, stated differently, at least 11 carbon atoms in the alkyl radical of the amine, said amines being preferably straight chain primary amines. However, it may be pointed out that the chlorinated and hydroxylated split chain primary amines, as well as the chlorinated and hydroxylated straight chain and split chain secondary and tertiary amines may be used in accordance with the present invention. Other straight chain primary amines which may be chlorinated and hydroxylated and then used for the treatment of waters, and particularly boiler waters, to prevent foaming therein are:

Undecyl amine, ($C_{11}H_{23}NH_2$)
Dodecyl amine, ($C_{12}H_{25}NH_2$)
Tridecyl amine, ($C_{13}H_{27}NH_2$)
Tetradecyl amine, ($C_{14}H_{29}NH_2$)
Pentadecyl amine, ($C_{15}H_{31}NH_2$)
Nonadecyl amine, ($C_{19}H_{39}NH_2$)
Eicosyl amine, ($C_{20}H_{41}NH_2$)
Heneicosyl amine, ($C_{21}H_{43}NH_2$)
Docosyl amine, ($C_{22}H_{45}NH_2$)
Tricosyl amine, ($C_{23}H_{47}NH_2$)
Tetracosyl amine, ($C_{24}H_{49}NH_2$)
Pentacosyl amine, ($C_{25}H_{51}NH_2$)
Hexacosyl amine, ($C_{26}H_{53}NH_2$)
Heptacosyl amine, ($C_{27}H_{55}NH_2$)
Octacosyl amine, ($C_{28}H_{57}NH_2$)
Nonacosyl amine, ($C_{29}H_{59}NH_2$) and the like.

Several of the above amines are known under other names, as, for example, lauryl amine ($C_{12}H_{25}NH_2$), myristyl amine ($C_{14}H_{29}NH_2$), mellisyl amine ($C_{30}H_{61}NH_2$), and cerotyl amine ($C_{26}H_{53}NH_2$).

It is within the province of the present invention to use the isomeric forms of the straight chain hydroxylated and halogenated amines or any other amines which are sparingly soluble or substantially insoluble in water and which inhibit the foaming of the water or aqueous bath being treated. For example, the amine group may be attached to the first, or the second, or the third, or any other subsequent carbon atoms in the chain.

Examples of such isomeric forms are as follows:

Considering the normal straight chain primary amine, as set forth in the immediately preceding table, said amine being undecyl amine (Formula $CH_3(CH_2)_{10}NH_2$), and the isomeric amine thereof is methyl, nonyl, methyl amine (Formula $CH_3(CH_2)_8CHNH_2CH_3$).

Other isomers of this same normal amine are:

Ethyloctylmethylamine
$CH_3(CH_2)_7CHNH_2CH_2CH_3$

Propylheptylmethylamine
$CH_3(CH_2)_6CHNH_2(CH_2)_2CH_3$

Butylhexylmethylamine
$CH_3(CH_2)_5CHNH_2(CH_2)_3CH_3$

Diamyl methyl amine
$CH_3(CH_2)_4CHNH_2(CH_2)_4CH_3$

Similar isomeric amines may be prepared from each of the amines listed in the immediately preceding table.

It may be stated that for nonacosyl amine ($C_{29}H_{59}NH_2$) there may be fifteen (15) corresponding isomers.

Secondary amines which may be hydroxylated and halogenated and used for the treatment of waters having ingredients present inducing foaming are:

Secondary heptylamine, $C_7H_{15}NHC_7H_{15}$
Secondary octyl amine, $C_8H_{17}NHC_8H_{17}$ Tertiary amines which may be hydroxylated and halogenated and suitable for carrying out the present invention are:

Tertiary octylamine, $(C_8H_{17})_3N$
Tertiary heptylamine, $(C_7H_{15})_3N$

Secondary and tertiary amines typified by the above mentioned amines have a number of isomeric forms, and these may be hydroxylated and halogenated and used in carrying out the present invention. Unbalanced straight chains or split chains result in many isomers for each amine having all alkyl groups the same.

Irrespective of to which carbon atom the amine group is attached, the material is a straight chain primary amine. Not only is it possible to hydroxylate and halogenate straight chain and split chain secondary and tertiary amines and use the same for the purpose herein set forth, but the isomeric forms of such hydroxylated and halogenated amines may be used. Referring to aliphatic and aromatic amines, if one of the hydrogen attached nitrogen is replaced there results a secondary amine, and if both the hydrogen attached nitrogen are replaced, there results a tertiary amine. Substituted alklyl carbons for hydrogen in the amine group tend to result in products of lower water solubility, and, in some cases at least, it is possible to obtain secondary or tertiary amines which have a lower water solubility than the corresponding normal amine. However, if amines of the above type which have been halogenated or hydroxylated, or mixtures of said amines which have been hydroxylated or halogenated, are to be used in accordance with the present invention, the substitution product must be one which has negligible water solubility. While the hydroxylated and chlorinated amines herein set forth and which are substituted are preferably aliphatic amines, it is within the province of the present invention to use hydroxylated and chlorinated aromatic amines which have been substituted but which are sparingly soluble in water and which inhibit foaming of waters having present constituents inducing foaming.

While the tannin extract herein set forth is preferably prepared from chestnut oak, it is obvious that tannin extracts may be used in accordance with the present invention which have been prepared from other well known prior art tannin-containing materials.

In carrying out the present invention, it is desirable to use hydroxylated or chlorinated aliphatic amines and their substitution products which have a high molecular weight and a specific gravity less than water, so as to eliminate any tendency of these anti-foam agents to settle to the bottom of the treatment vessel. However, anti-foam agents of the character specified having a density greater than water may be used, provided it is used in combination with a material which will have a buoying effect upon it, as well as with other materials which will enable the anti-foam agent to be satisfactorily dispersed, and give the anti-foam and/or dispersing agent a body sufficient to render the dispersion permanent.

Halogen substituted amines suitable for carrying out the present invention may be prepared by chlorinating the amines, said chlorination being effected by means of chlorine gas acting on a suitable amine, as, for example, a chloroform solution of the amine or on a melted amine. Various amounts of chlorine may be added.

No specific formulae are assigned to the chlorinated amines set forth in the following table, due to the fact that these compounds may be chlorinated to various degrees and the resulting chlorinated compounds will vary accordingly. The following table sets forth the amines which were chlorinated, and the gain in weight during chlorination in terms of the final weight. In other words, taking the weight of the chlorinated amine as 100%, each compound treated had its weight increased due to chlorination by the percentages set forth in the table:

| Name of Amine Chlorinated | Increase in weight during chlorination in terms of final weight |
| --- | --- |
|  | Per cent |
| Hexadecyl amine | 13.0 |
| Heptadecyl amine | 13.2 |
| Octadecyl amine | 13.5 |

It may be stated that the degree of chlorination may vary considerably from the amounts set forth in the table without greatly lessening the value of the anti-foam agent. It is desired to point out that during chlorination the amine increases in weight.

By introducing other groups into the herein set forth amines, a method is provided of increasing the specific gravity of the anti-foam agent. However, it is desired to point out that for most purposes, the specific gravity of the agent should not be increased so that it is greater than water, although as pointed out, such a material may be used, provided it is mixed with a buoying agent and a bodying agent, as set forth.

The hydroxy substituted amines may be made from the chlorinated amines above set forth, and this may be accomplished by hydrolyzing the chlorinated amines to produce a hydroxy amine. Particularly satisfactory results may be obtained by using as the anti-foam agent in the compositions herein referred to, the hydroxy substituted products of hexadecyl, heptadecyl and octadecyl amines.

Since the chlorinated aliphatic amines are hydrolyzed to produce the hydroxy amine, the latter will usually contain a certain proportion of the chlorinated amine. Usually the hydroxy amine is present in a predominating proportion and the chlorinated amine is present in a minor proportion. However, the hydroxylation may be carried out so that the mixture may comprise equal parts of chlorinated amine and hydroxy amine, or the chlorinated amine may be present in the mixture in a predominating proportion and the hydroxy amine in a relatively minor proportion.

In general, it may be stated that the chlorinated aliphatic amines and the hydroxylated aliphatic amines, including the primary, secondary and tertiary amines, which are insoluble in water, steam distill to a negligible extent and show little tendency to saponify with the ingredients of the water, such as boiler water, may be used to prevent foaming in waters in general, preferably those waters which contain excess alkalinity, for example, boiler waters. If castor oil, which is a well known anti-foaming agent for water, is used to treat water which does not contain excess alkalinity, the castor oil becomes saponified and is thereby rendered ineffective and/or harmful. Raw waters and waters softened in any manner, as, for example, by the lime soda process or by treatment with zeolite, may be treated with the halogenated aliphatic amines or the chlorinated aliphatic amines or mixtures of the same in the proportions above set forth, and function effectively as anti-foaming agents.

As previously pointed out, the chlorinated aliphatic amines or the hydroxy aliphatic amines, or mixtures thereof, may be used in powder form, and in some cases may be mixed with other agents used for the treatment of water, as, for example, lime or aluminates, or the lime soda mixtures may be mixed with the chlorinated aliphatic amine or the hydroxy aliphatic amine, or with mixtures of the two. Alternatively, the halogenated aliphatic amines and/or the hydroxy aliphatic amines, or mixtures thereof, may be mixed with an organic or inorganic bodying material, as, for example, a material producing borate ions. There may be also present a carbohydrate bodying and/or dispersing medium such as corn meal, dextrine, or starch degradation products. Gums may also be used as the bodying medium.

This application is a continuation-in-part of each of the following applications: Serial No. 193,366, now Patent No. 2,363,921; Serial No. 193,367, now Patent No. 2,363,922; and Serial No. 193,368, now Patent No. 2,363,923, all granted November 28, 1944.

What is claimed is:

1. The method of treating an aqueous bath having present alkaline constituents inducing foaming therein comprising reducing the foaming of the bath by introducing into the same a mixture of a halogenated aliphatic amine and a hydroxy aliphatic amine, each of said amines having at least eleven carbon atoms in an alkyl radical thereof and being substantially insoluble in the aqueous bath, and showing little tendency to saponify with the ingredients of the bath.

2. The method of treating an aqueous bath having present alkaline constituents inducing foaming therein comprising reducing the foaming of the bath by introducing therein a halogenated aliphatic amine having at least eleven carbon atoms, said amine being substantially insoluble in the aqueous bath and showing little tendency to saponify with the ingredients of the aqueous bath.

3. The method of treating boiler water characterized by excess alkalinity and having constituents present inducing foaming therein comprising reducing the foaming of said boiler water by introducing therein a hydroxy aliphatic amine having at least 11 carbon atoms, said amine being substantially insoluble in the boiler water and showing little tendency to saponify with the ingredients of said boiler water.

4. The method of treating an aqueous bath having present alkaline constituents inducing foaming therein comprising reducing the foaming of said aqueous bath by introducing therein a mixture of a water softening agent and a halogenated aliphatic amine having at least eleven carbon atoms, said amine being substantially insoluble in said aqueous bath and showing little tendency to saponify with the ingredients thereof.

5. The method of treating boiler water characterized by excess alkalinity and having present constitutents inducing foaming therein comprising reducing the foaming of said boiler water by introducing therein a mixture of a water softening agent and a hydroxy aliphatic amine having at least eleven carbon atoms in an alkyl radical thereof, said amine being substantially insoluble in the boiler water and showing little tendency to saponify with the ingredients thereof.

6. The method of treating an aqueous bath having present alkaline constituents inducing foaming therein comprising reducing the foaming of said aqueous bath by introducing therein a mixture of lime soda water softening constituents and a halogenated aliphatic amine having at least eleven carbon atoms in an alkyl radical thereof, said amine being substantially insoluble in the aqueous bath and showing little tendency to saponify with the ingredients thereof.

7. The method of treating boiler water having present alkaline constituents inducing foaming therein comprising reducing the foaming of said boiler water by introducing therein a mixture of lime soda water softening constituents and a hydroxy aliphatic amine substantially insoluble in the boiler water, said hydroxy aliphatic amine containing at least eleven carbon atoms in an alkyl radical thereof and showing little tendency to saponify with the ingredients of the boiler water and being substantially insoluble.

8. The method of treating boiler water characterized by excess alkalinity, and having present constituents inducing foaming therein, comprising reducing the foaming of said boiler water by introducing therein a mixture of a halogenated aliphatic amine and a hydroxy aliphatic amine, each of said amines having at least eleven carbon atoms in an alkyl radical, said mixture of amines being substantially insoluble in boiler water, steam distilling to a negligible extent, and showing little tendency to saponify with the ingredients of the boiler water.

9. The method of treating boiler water characterized by excess alkalinity, and having present constituents inducing foaming therein, comprising reducing the foaming of the boiler water by introducing therein a mixture of lime soda water softening material, a halogenated aliphatic amine, and a hydroxy aliphatic amine, each of said amines having at least eleven carbon atoms in an alkyl radical thereof, said amines being substantially insoluble in the boiler water, steam distilling to a negligible extent, and showing little tendency to saponify with the ingredients of the boiler water.

10. An anti-foaming composition for treating an aqueous bath having present alkaline constituents inducing foaming therein, said composition comprising essentially an aliphatic halogenated amine having at least eleven carbon atoms in an alkyl radical thereof and a dispersing agent for said amine, said amine having the properties of reducing the foaming of the bath, being substantially insoluble in the bath, and showing little tendency to saponify with the ingredients of the bath.

11. An anti-foaming composition for treating an aqueous bath having present alkaline constituents inducing foaming therein, comprising a mixture of a hydroxy aliphatic amine and a predominating proportion of a halogenated aliphatic amine, each of said amines having at least eleven carbon atoms in an alkyl radical thereof, said mixture of amines having the property of reducing the foaming properties of the bath, being insoluble therein, and showing little tendency to saponify with the ingredients of the bath.

12. The method of treating an aqueous bath having present alkaline constituents introducing foaming therein comprising reducing the foaming properties of the bath by introducing into the bath a mixture of primary and secondary halogenated aliphatic amines, each containing at least eleven carbon atoms, said amines being substantially insoluble in the aqueous bath.

13. Boiler water containing alkaline constituents and carrying a dispersed halogenated aliphatic amine containing at least eleven carbon atoms and characterized by the property of reducing the foaming tendencies of the boiler water, said halogenated aliphatic amine being substantially insoluble in water, and steam distilling to a negligible extent, said halogenated amine being present in an amount sufficient to inhibit foaming of the boiler water.

14. Boiler water containing alkaline constituents and carrying a dispersed hydroxy aliphatic amine containing at least eleven carbon atoms and characterized by the property of reducing the foaming tendencies of the boiler water, said hydroxy aliphatic amine being substantially insoluble in water, and steam distilling to a negligible extent, said hydroxy amine being present in an amount sufficient to inhibit foaming of the boiler water.

15. Boiler water containing alkaline constituents and carrying a dispersed mixture of secondary and tertiary halogenated aliphatic amines, each containing at least eleven carbon atoms and characterized by the property of reducing the foam tendencies of the boiler water, said mixture being substantially insoluble in water and steam distilling to a negligible extent, said mixture being present in an amount sufficient to inhibit foaming of the boiler water.

16. The method of treating boiler water having present constituents inducing foaming therein comprising reducing the foaming of the boiler water by introducing into the latter an anti-foam composition comprising tannin and from 2 to 35% of a hydroxy aliphatic amine having at least eleven carbon atoms, said amine being characterized by the property of being substantially insoluble in the boiler water and showing little tendency to steam distill, said anti-foam composition being present in the boiler water in an amount to inhibit foaming.

17. The method of treating boiler water having present constituents inducing foaming therein comprising reducing the foaming of the boiler water by introducing into the latter an anti-foam composition comprising tannin and from 2 to 35% of a halogenated aliphatic amine having at least eleven carbon atoms, said amine being characterized by the property of being substantially insoluble in the boiler water and showing little tendency to steam distill, said anti-foam composition being present in the boiler water in an amount to inhibit foaming.

WAYNE L. DENMAN.

REFERENCES CITED

The following references are of record in the file of this patent:

UNITED STATES PATENTS

| Number | Name | Date |
|---|---|---|
| 1,981,634 | Richardson et al. | Nov. 20, 1934 |
| 2,328,551 | Gunderson | Sept. 7, 1943 |
| 2,073,380 | Flett | Mar. 23, 1937 |
| 2,274,807 | Rawlins et al. | Mar. 3, 1942 |

FOREIGN PATENTS

| Number | Country | Date |
|---|---|---|
| 358,114 | Great Britain | Oct. 5, 1931 |